(12) United States Patent
Ito et al.

(10) Patent No.: US 8,116,625 B2
(45) Date of Patent: Feb. 14, 2012

(54) METHODS AND SYSTEMS FOR DETECTING SMALL SPAN LOSS CHANGES IN FIBER OPTIC NETWORKS

(75) Inventors: Chris Ito, Columbia, MD (US); Sandra Feldman, Owings Mills, MD (US)

(73) Assignee: Ciena Coporation, Linthicum, MD (US)

( * ) Notice: Subject to any disclaimer, the term of this patent is extended or adjusted under 35 U.S.C. 154(b) by 531 days.

(21) Appl. No.: 12/397,575

(22) Filed: Mar. 4, 2009

(65) Prior Publication Data

US 2010/0226644 A1  Sep. 9, 2010

(51) Int. Cl.
*H04B 10/08*  (2006.01)
(52) U.S. Cl. ............... 398/30; 398/33; 398/28; 398/25
(58) Field of Classification Search .............. 398/30, 398/33, 28, 25
See application file for complete search history.

(56) References Cited

U.S. PATENT DOCUMENTS

| | | | |
|---|---|---|---|
| 4,942,623 A | 7/1990 | Asawa et al. | |
| 5,003,623 A | 3/1991 | Asawa | |
| 5,194,847 A | 3/1993 | Taylor et al. | |
| 6,765,659 B1 | 7/2004 | Bhatnagar et al. | |
| 6,891,607 B2 * | 5/2005 | Bisson et al. | 356/73.1 |
| 7,376,293 B2 | 5/2008 | Murphy et al. | |
| 2005/0041969 A1 * | 2/2005 | Bisson et al. | 398/30 |
| 2006/0139742 A1 * | 6/2006 | Frankel et al. | 359/341.4 |

\* cited by examiner

*Primary Examiner* — Kinam Park
(74) *Attorney, Agent, or Firm* — Clements Bernard PLLC; Christopher L. Bernard; Lawrence A. Bratta, Jr.

(57) ABSTRACT

The present disclosure provides methods and systems for detecting small span loss changes in fiber optic networks. The present invention utilizes existing equipment without additional hardware to provide span loss measurements in a highly accurate manner. In an exemplary embodiment, the present invention utilizes power measurements associated with an optical supervisory channel (OSC) at both ends of a fiber span. These measurements are periodically sampled taking into account propagation delay along the fiber span. Further, these measurements are integrated or time-averaged to account for temporary fluctuations. The present invention can be utilized for intrusion detection (i.e., unwanted fiber taps), fiber degradation, and fiber aging performance. The present invention satisfies the criteria for a feasible (i.e., makes use of current architecture), cost-effective (i.e., does not require additional hardware), and highly accurate solution (i.e., capable of detecting span loss changes of 0.01 dB or 0.03%).

20 Claims, 10 Drawing Sheets

| VOA (dB) | % Change in Span Loss (dB) | Time-Averaged Span Loss (dB) | Measured Span Loss Change (dB) | Error in Detecting Span Loss Change (dB) |
|---|---|---|---|---|
| 0 | 0 | 26.06 | 0.00 | 0 |
| 0.01 | 0.03 | 26.07 | 0.01 | 0 |
| 0.02 | 0.05 | 26.08 | 0.02 | 0 |
| 0.04 | 0.09 | 26.10 | 0.04 | 0 |

*FIG. 8*

METHODS AND SYSTEMS FOR DETECTING SMALL SPAN LOSS CHANGES IN FIBER OPTIC NETWORKS

FIELD OF THE INVENTION

The present invention relates generally to optical networking. More particularly, the present invention provides methods and systems for detecting small optical span loss changes (e.g., within an accuracy of 0.01 dB) in fiber optic networks utilizing existing hardware, such as optical supervisory channels (OSCs), photo-detectors, and the like.

BACKGROUND OF THE INVENTION

Today's fiber optic networks are highly intelligent, providing the efficient communication of information. The efficiency is largely enabled by the communication between nodes in fiber optic networks. For example, through inter-node communication, channel power can be monitored throughout the network, which allows for automated provisioning, such as channel power offsets at transmitter nodes to compensate for spectral ripple, gain at inline amplifiers nodes to compensate for span loss, and the like. For example, inter-node communication can achieved using a dedicated optical wavelength (1510 nm, 1625 nm, etc.), generally known as an optical supervisory channel (OSC) such as described in commonly assigned U.S. Pat. No. 6,765,659, issued Jul. 20, 2004 and entitled "OPTICAL SUPERVISORY CHANNEL APPARATUS AND METHOD FOR MEASURING OPTICAL PROPERTIES", the contents of which are herein incorporated by reference.

Conventionally, a solution for detecting small span loss changes does not exist that satisfies all of the following criteria: first, the solution uses standard hardware typically found in a fiber optic network; second, the solution does not involve the use of additional hardware beyond that which is found in a typical fiber optic network; and third, the solution is capable of measuring small span loss changes (e.g., <1% power change, such as around 0.01 dB change in power).

Satisfying the first criterion is important from a feasibility standpoint. If the solution requires non-standard hardware, it may not be a feasible solution since the costs associated with using non-standard hardware generally outweigh the benefits. For example, small changes in span loss have been shown to be detectable with the use of multi-mode fiber (e.g., U.S. Pat. Nos. 5,003,623, 4,942,623, and 7,376,293). However, single-mode fiber typically dominates network infra-structures since its dispersive properties are more easily managed compared to multi-mode fiber, and these mechanisms are not adaptable to single-mode fiber.

The second criterion is important from a cost/complexity perspective. If the solution requires additional hardware, both the cost and complexity of the system increase. For example, small changes in span loss have been shown to be detectable with the use of a coherent light source and an interferometer (e.g., U.S. Pat. No. 5,194,847).

The first and second criteria can be satisfied in a fiber optic network that makes use of an OSC. In general, the OSC can be used to measure, among other properties, the span loss. It has been demonstrated that the OSC can be used to measure span loss changes by measuring the power of the OSC received at the output of a fiber span (OSC-Rx) and comparing it to the nominal power of the OSC transmitted at the input of the fiber span (OSC-Tx) (e.g., U.S. Pat. No. 6,891,607). While satisfying the first and second criteria, the technique does not satisfy the third criteria since it is not capable of measuring small span loss changes (e.g., <1% power change). This limitation is rooted in the assumption that the nominal OSC-Tx is constant. As a result, fluctuations in OSC-Tx are observed in OSC-Rx, rendering small power fluctuations in OSC-Tx indistinguishable from small span loss changes.

BRIEF SUMMARY OF THE INVENTION

In various exemplary embodiments, the present invention provides methods and systems for detecting small span loss changes in fiber optic networks. The present invention utilizes existing equipment without additional hardware to provide span loss measurements in a highly accurate manner (i.e., capable of detecting span loss changes of 0.01 dB or 0.03%). In an exemplary embodiment, the present invention utilizes power measurements associated with an optical supervisory channel (OSC) at both ends of a fiber span. These measurements are periodically sampled taking into account propagation delay along the fiber span. Further, these measurements are integrated or time-averaged to account for temporary fluctuations in the fiber span loss.

In an exemplary embodiment of the present invention, a method for detecting small span loss changes in a fiber optic span includes sampling power measurements at a transmit point at a predetermined time; sampling power measurements at a receive point at the predetermined time plus a time delay, wherein the transmit point and the receive point define endpoints of the fiber optic span; calculating fiber span loss for the predetermined time responsive to the sampled power measurements at the transmit point and at the receive point; repeating the sampling steps and the calculating step; and integrating the calculated fiber span losses. The time delay includes a finite propagation time delay (PTD) of optical signals based on the fiber distance from the transmit point to the receive point. Optionally, the time delay $\Delta t$ is calculated as $$\Delta t = \frac{nL}{c},$$

where n is the fiber refractive index, L is the fiber length from the transmit point to the receive point, and c is the speed of light in a vacuum. The calculating fiber span loss can include dividing the sampled power measurement at the receive point by the sampled power measurement at the transmit point. Optionally, the sampling steps include measuring power of an optical supervisory channel added at the transmit point and removed at the receive point, and the sampling steps can utilize a photo-detector at each of the transmit point and the receive point. Alternatively, the photo-detector at each of the transmit point and the receive point is controlled by a computer, and the computer is configured to control the sampling steps, and perform the calculating and integrating steps. The method can further include detecting fiber taps on the fiber span responsive to the integrated fiber span losses. Optionally, the method further includes detecting fiber degradation on the fiber span responsive to the integrated fiber span losses. Alternatively, the method further includes storing the integrated fiber span losses over time; and analyzing fiber span aging margin responsive to the stored integrated fiber span losses over time.

In another exemplary embodiment of the present invention, a system for detecting small span loss changes in a fiber optic span includes a processor communicatively coupled to memory and a network interface, wherein the processor is configured to: request a power measurement at a transmit point at a predetermined time; request a power measurement at a receive point at the predetermined time plus a time delay, wherein the transmit point and the receive point define endpoints of the fiber optic span; calculate fiber span loss of the fiber optic span responsive to the requested power measurements at the transmit point and at the receive point; store the calculated fiber span loss; and time average the calculated fiber span loss with one or more stored calculated fiber span losses. Optionally, the processor is located in one of a network management system, an element management system, a craft interface, and a controller on an optical network element. The request steps can be directed to a photo-detector at each of the transmit point and the receive point. Optionally, the photo-detector at each of the transmit point and the receive point measures an optical supervisory channel added at the transmit point and removed at the receive point. The request steps can be directed to a field deployed optical network element with an optical supervisory channel; and the system requires no additional hardware on the field deployed optical network element to detect small span loss changes in the fiber optic span. Optionally, the time delay includes a finite propagation time delay (PTD) of optical signals based on the fiber distance from the transmit point to the receive point; and the time delay $\Delta t$ is calculated as $$\Delta t = \frac{nL}{c},$$

where n is the fiber refractive index, L is the fiber length from the transmit point to the receive point, and c is the speed of light in a vacuum. Optionally, the processor is further configured to raise an alarm responsive to one of detecting fiber taps on the fiber span responsive to the time averaged fiber span losses and detecting fiber degradation on the fiber span responsive to the time averaged fiber span losses. Alternatively, the system further includes a data store, wherein a plurality of time averaged fiber span losses are stored in the data store for the fiber span, and wherein the processor is further configured to analyze fiber span aging margin responsive to the plurality of time averaged fiber span losses.

In yet another exemplary embodiment of the present invention, an optical network configured to detect small span loss changes in a fiber optic span includes a first node including an add port for an optical supervisory channel and a first tap connected to the add port and a first photo-detector; a second node including a drop port for the optical supervisory channel and a second tap connected to the drop port and a second photo-detector, wherein the first node and the second node communicate the optical supervisory channel over the fiber optic span; and a computer communicatively coupled to the first photo-detector and the second photo-detector, wherein the computer is configured to: request a power measurement at the first photo-detector at a first predetermined time; request a power measurement at the second photo-detector at a second predetermined time, wherein the second predetermined time includes the first predetermined time plus a time delay based on a length of the fiber optic span; calculate fiber span loss of the fiber optic span responsive to the requested power measurements; store the calculated fiber span loss; and time average the calculated fiber span loss with one or more stored calculated fiber span losses. The computer can be further configured to raise an alarm responsive to one of detecting fiber taps on the fiber optic span responsive to the time averaged fiber span losses and detecting fiber degradation on the fiber optic pan responsive to the time averaged fiber span losses; and a plurality of time averaged fiber span losses are stored in the computer for the fiber optic span, and wherein the computer is further configured to analyze fiber span aging margin responsive to the plurality of time averaged fiber span losses.

BRIEF DESCRIPTION OF THE DRAWINGS

The present invention is illustrated and described herein with reference to the various drawings, in which like reference numbers denote like method steps and/or system components, respectively, and in which:

FIG. 8 illustrates a table with a summary of performance in detecting small span loss changes from the various graphs in FIGS. 3-7 according to an exemplary embodiment of the present invention;

DETAILED DESCRIPTION OF THE INVENTION

In various exemplary embodiments, the present invention provides methods and systems for detecting small span loss changes in fiber optic networks. The present invention utilizes existing equipment without additional hardware to provide span loss measurements in a highly accurate manner (i.e., capable of detecting span loss changes of 0.01 dB or 0.03%). In an exemplary embodiment, the present invention utilizes power measurements associated with an optical supervisory channel (OSC) at both ends of a fiber span. These measurements are periodically sampled taking into account propagation time delay along the fiber span. Further, these measurements are integrated or time-averaged to account for temporary fluctuations in the fiber span loss thereby enabling small loss changes to be detected. The present invention can be utilized for intrusion detection (e.g., unwanted fiber taps), fiber degradation detection, and fiber aging performance. The present invention satisfies the criteria for a feasible (i.e., makes use of current architecture), cost-effective (i.e., does not require additional hardware), and highly accurate solution (i.e., capable of detecting span loss changes of 0.01 dB or 0.03%).

Figure 1:
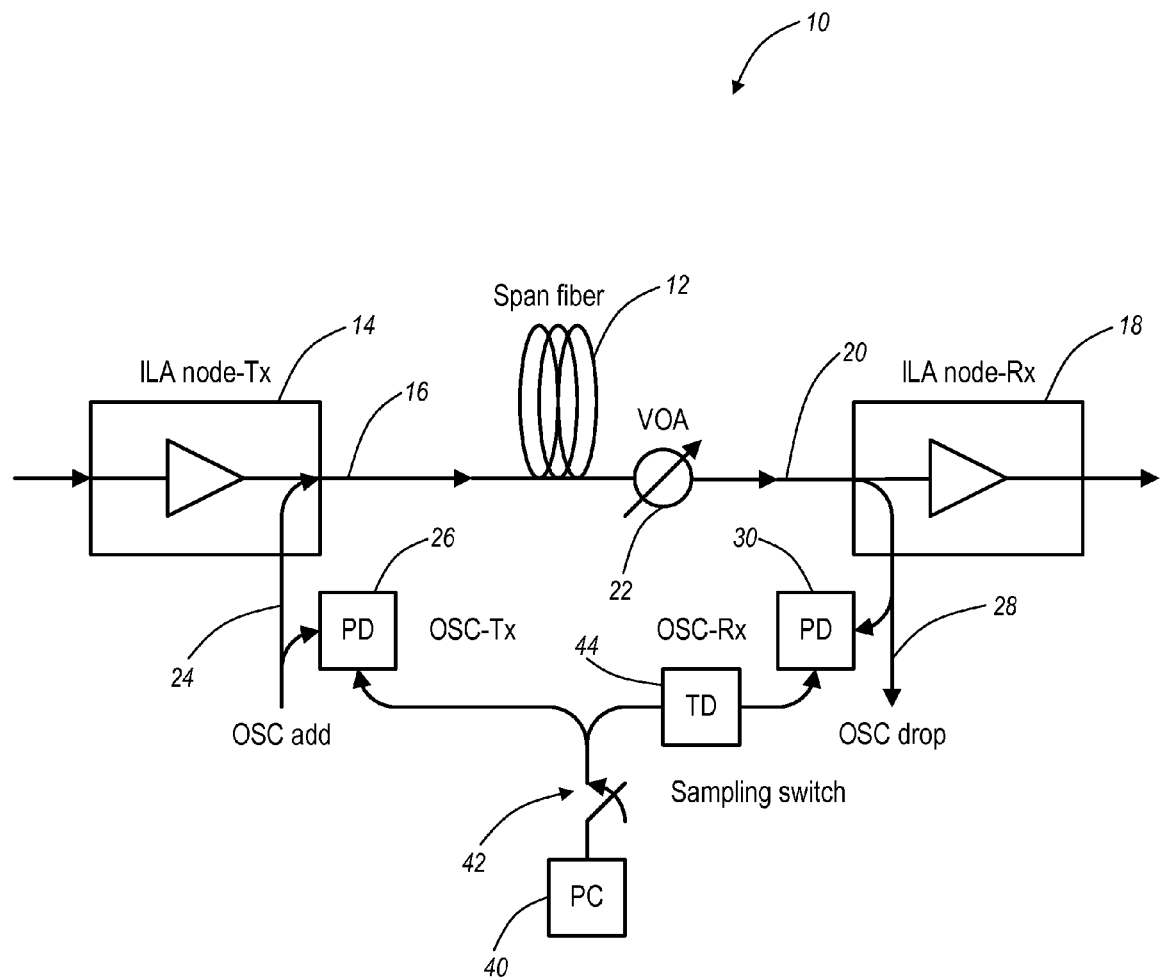
FIG. 1 illustrates a fiber optic system for measuring small span loss changes according to an exemplary embodiment of the present invention.

Referring to FIG. 1, a fiber optic system 10 for measuring small span loss changes is illustrated according to an exemplary embodiment of the present invention. The system 10 includes a fiber span 12 with a transmit in-line amplifier (ILA node-Tx) 14 at an input 16 of the fiber span 12 and a receive in-line amplifier (ILA node-Rx) 18 at an output 20 of the fiber span 12 following a variable optical attenuator (VOA) 22. The VOA 22 is utilized to increase the span loss of the fiber span 12 between the input 16 and the output 20. In this exemplary embodiment, the VOA 22 is utilized for measurement purposes to simulate variable span loss on the fiber span 12. In field deployments, the VOA 22 is omitted with the variable span loss arising due to fiber length and ambient conditions that affect small span loss changes. Other factors can also affect small span loss changes, such as tampering. FIG. 1 includes the transmit in-line amplifier (ILA node-Tx) 14 and the receive in-line amplifier (ILA node-Rx) 18. The present invention can also operate without transmit and/or receive amplifiers. Specifically, FIG. 1 is an exemplary embodiment of the fiber optic system 10 with the present invention. Those of ordinary skill in the art will recognize that different equipment configurations are also contemplated by the present invention.

The fiber optic system 10 illustrates a single fiber span, i.e. the fiber span 12, from the post amplifier, i.e. the ILA node-Tx 12, to the pre-amplifier, i.e. the ILA node-Rx 18. The fiber span 12 can include single mode fiber (SMF) including various types of non-dispersion shifted fiber (NDSF), non-zero dispersion shifted fiber (NZDSF), dispersion shifted fiber (DSF), and the like. Those of ordinary skill in the art will recognize that additional components may be included in the fiber optic system, such as dense wave division multiplexing (DWDM) transceivers, multiplexers/de-multiplexers, dispersion compensation elements, optical add-drop multiplexers (OADM, ROADM), and the like. Additionally, in field deployments, the ILA node-Tx 12 and the ILA node-Rx 18 are located in geographically diverse locations, i.e. ingress and egress location. The fiber optic system 10 is a typical configuration seen in metro DWDM, regional DWDM, long haul DWDM, and the like.

At the ILA node-Tx 14, an out-of-band (e.g., 1510 nm, 1625 nm, etc.) optical supervisory channel (OSC) 24 is added to the channel path after a gain element and coupled to the input 16. The added OSC 24 is tapped to a photo-detector (PD) 26, where transmitted OSC power (OSC-Tx) is measured. At the ILA node-Rx 18, the OSC 24 is dropped from the channel path before the gain element at an OSC drop 28. The dropped OSC 24 is also tapped to a photo-detector (PD) 30, where the received OSC power (OSC-Rx) is measured. Accordingly, the span loss (SL), measured in dB units, is given by:

$$SL = \frac{OSC\_Rx}{OSC\_Tx}.$$

The fiber optic system 10 further includes a computer 40 communicatively coupled to the PDs 26, 30. The computer 40 is utilized to control a sampling rate of the OSC 24 at the PDs 26, 30, to record the measured power readings (OSC-Rx, OSC-Tx), and to perform power calculations of SL. Additionally, the fiber optic system 10 can include a sampling switch 42 and a time delay (TD) 44. The sampling switch 42 provides connectivity to the PDs 26, 30 at a predetermined time period for measurement. Alternatively, the sampling switch 42 can be omitted with the PDs 26, 30 providing periodic measurements at set intervals to the computer 40. The TD 44 provides compensation for a time delay equal to a finite propagation time delay (PTD) of optical signals from the input 16 to the output 20 of the fiber span 22.

The OSC 24 is typically added/dropped at every site in an optical network, e.g. amplifiers, regenerators, terminals, OADM, etc. Thus, the OSC 24 is an ideal signal for use in the small loss measuring techniques of the present invention. Those of ordinary skill in the art will recognize that the mechanisms described herein can also apply to other optical signals, such as information carrying signals and the like.

Figure 2:
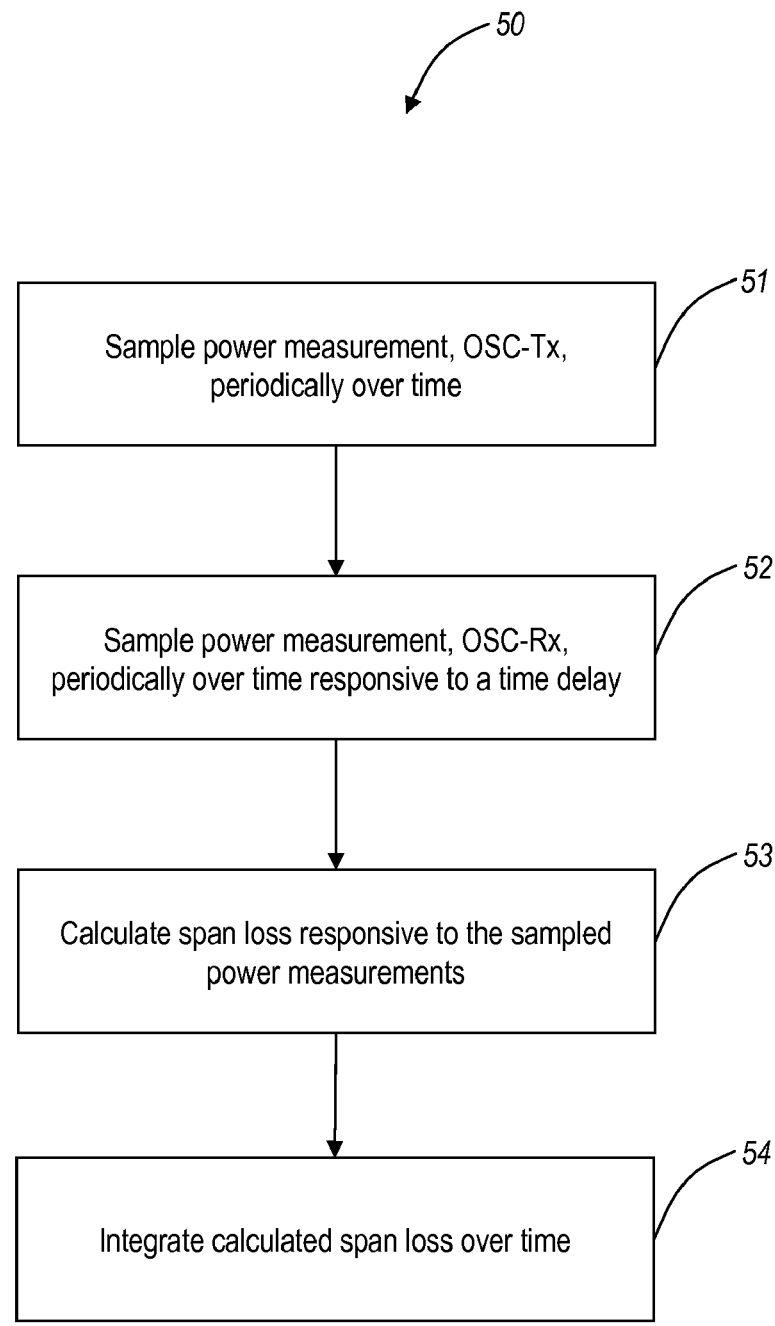
FIG. 2 illustrates a flowchart of a measurement technique for measuring small changes in optical span loss according to an exemplary embodiment of the present invention.

Referring to FIG. 2, a flowchart illustrates a measurement mechanism 50 for measuring small changes in optical span loss according to an exemplary embodiment of the present invention. The measurement mechanism 50 can be implemented on the fiber optic system 10 of FIG. 1 or on any other fiber optic system utilizing an OSC or other optical signal capable of power measurements at receive and transmit point.

First, the measurement mechanism 50 samples power measurements at a transmit point of an OSC, i.e. OSC-Tx, periodically over time (step 51). OSC-Tx should not be assumed constant at its nominal value since laser power fluctuations and aging can cause the OSC-Tx to vary over time. To isolate power changes that occur only in the span, OSC-Tx is sampled periodically over time. A computer can be used to control the sampling rate and sample and record OSC-Tx from a corresponding PD.

At the receive point of the OSC, i.e. OSC-Rx, the power measurement must be sampled periodically over time responsive to a time delay (step 52). The OSC-Tx and OSC-Rx can not be sampled synchronously since there is a finite propagation time delay (PTD) of optical signals from the input to the output of the fiber span. To account for the PTD, OSC-Tx and OSC-Rx can be sampled asynchronously by a time delay (TD) equal to the PTD, Δt, where Δt is calculated as:

$$\Delta t = \frac{nL}{c},$$

where n is the fiber refractive index, L is the fiber length, and c is the speed of light in a vacuum. For example, optical signals propagating over a fiber of length L=40 km has a time delay Δt≈0.2 ms. In this example, OSC-Tx is measured, and then OSC-Rx is measured 0.2 ms later.

Next, measurement mechanism 50 calculates span loss responsive to the sampled power measurements (step 53). Here, the measurement mechanism 50 can use the formula described above for SL. Finally, the measurement mechanism 50 integrates the calculated span loss over time (step 54). By integrating the span loss over time, the impact of temporary fluctuations on the average span loss are reduced, thereby allowing small span loss changes to be detected. Here, the measurement mechanism 50 can store previously calculated span losses to perform a time-averaging or integration with a currently calculated span loss.

Figure 3:
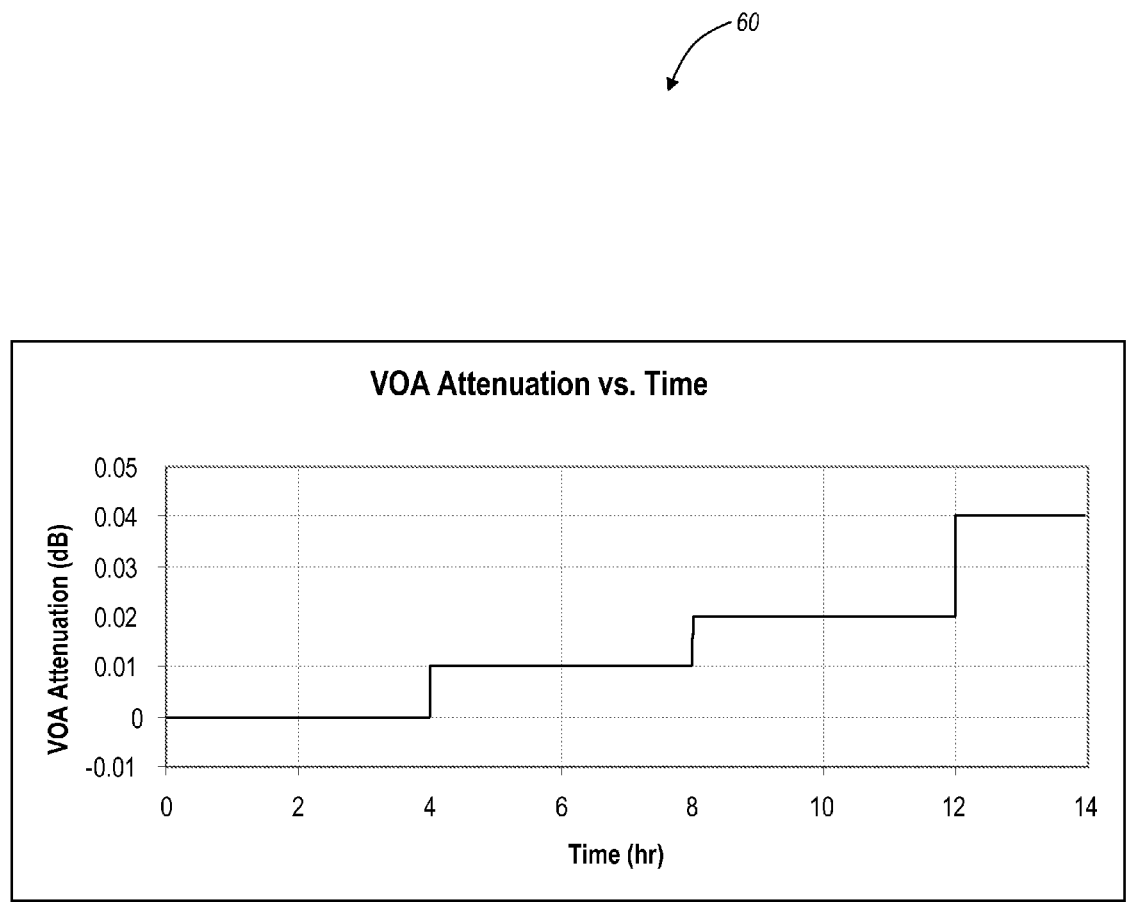
FIG. 3 illustrates a graph of variable optical attenuator (VOA) attenuation versus time for a test according to an exemplary embodiment of the present invention.

Referring to FIG. 3, to verify the ability of the present invention to detect small span loss changes, a VOA was used to induce small span loss changes over a 40 km span, such as the fiber optic system 10 of FIG. 1. FIG. 3 illustrates a graph 60 of VOA attenuation versus time according to an exemplary embodiment of the present invention. The VOA attenuation was increased by 0.01 dB every four hours over a twelve hour period and by 0.02 dB at the twelfth hour. For example, this can be implemented on the fiber optic system 10 of FIG. 1 through the VOA 22.

Figure 4:
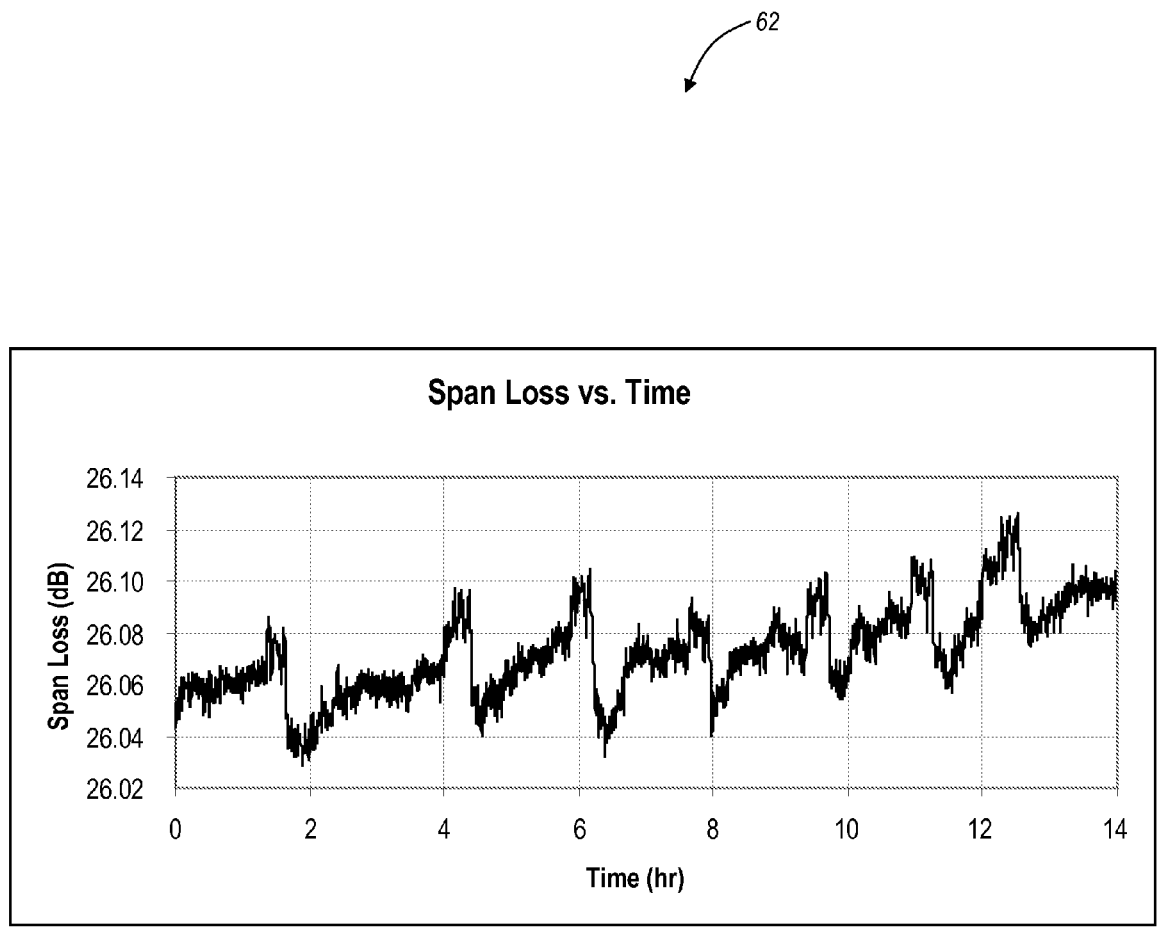
FIG. 4 illustrates a graph of measured span loss versus time according to an exemplary embodiment of the present invention.

Referring to FIG. 4, a graph 62 illustrates measured span loss versus time according to an exemplary embodiment of the present invention. The graph 62 shows the small span loss changes induced through the VOA in FIG. 3. The span loss was determined by measuring OSC-Tx and OSC-Rx with a time delay TD=0.2 ms (for the 40 km span), at a sampling rate R=15 samples/sec.

The span loss fluctuations seen in the graph 62 can be attributed to the response of the VOA. Over time, the VOA temperature increases, causing the attenuation to drift from its set value. Once the attenuation reaches a certain threshold, the VOA compensates to re-establish the set attenuation value. For example, in the graph 62, the VOA attenuation should be constant from 0-4 hours. However, from 0-1.8 hours the attenuation slowly increases due to temperature. At 1.8 hours, the attenuation reaches a threshold, causing the VOA to compensate, even under-shooting the target attenuation, until the set attenuation value is eventually re-established at the 2.3 hour mark. The attenuation remains relatively stable until the 4 hour mark, when the VOA attenuation is intentionally changed by an external stimulus. At this point, the VOA responds by over-shooting, before reaching the target attenuation.

Figure 5:
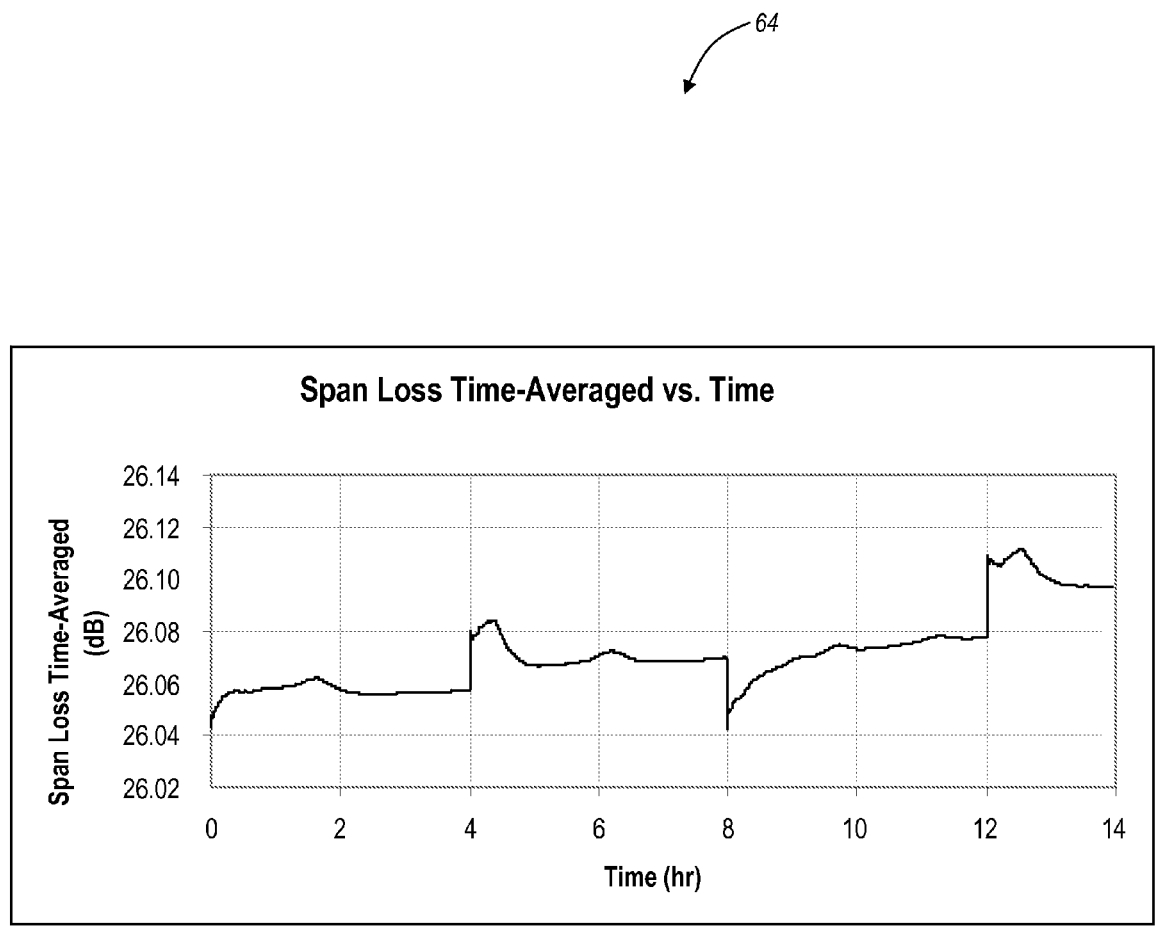
FIG. 5 illustrates a graph of span loss time-averaged (i.e., integrated) versus time according to an exemplary embodiment of the present invention.

Referring to FIG. 5, a graph 64 illustrates span loss time-averaged or integrated versus time according to an exemplary embodiment of the present invention. The graph 64 represents an integrated version of the graph 62 in FIG. 4. Despite transient fluctuations, which obscure very small, persistent changes in loss, integrating the span loss over time provides a time-averaged value, effectively reducing the impact that the fluctuations have on accurately detecting small (long-term) span loss changes. The graph 64 is obtained through performing a mathematical integration operation on the graph 62 in FIG. 4.

Figure 6:
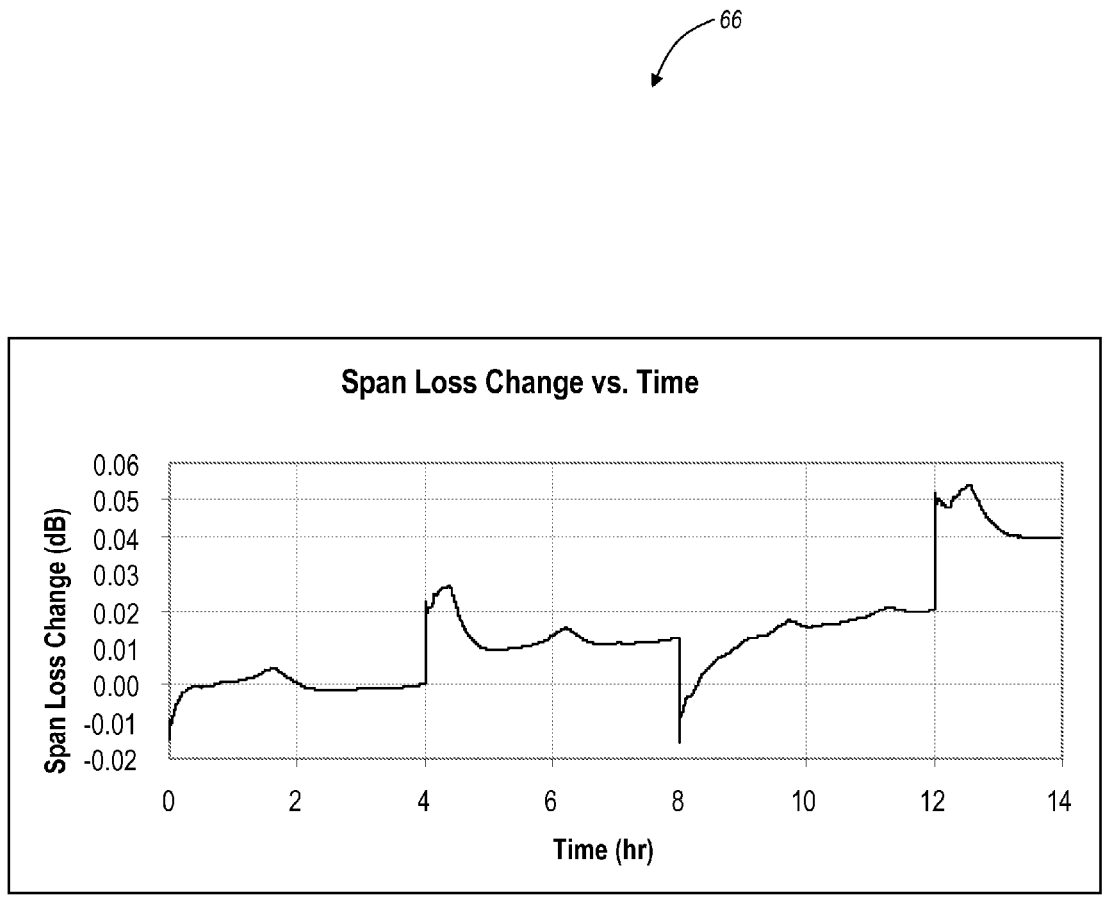
FIG. 6 illustrates a graph of a result of comparing the time-averaged span loss from the graph in FIG. 5 to the nominal span loss, as given by the VOA attenuation from the graph in FIG. 3 thereby providing span loss change according to an exemplary embodiment of the present invention.

Referring to FIG. 6, a graph 66 illustrates a result of comparing the time-averaged span loss from the graph 64 in FIG. 5 to the nominal span loss, as given by the VOA attenuation from the graph 60 in FIG. 3 thereby providing span loss change according to an exemplary embodiment of the present invention.

Figure 7:
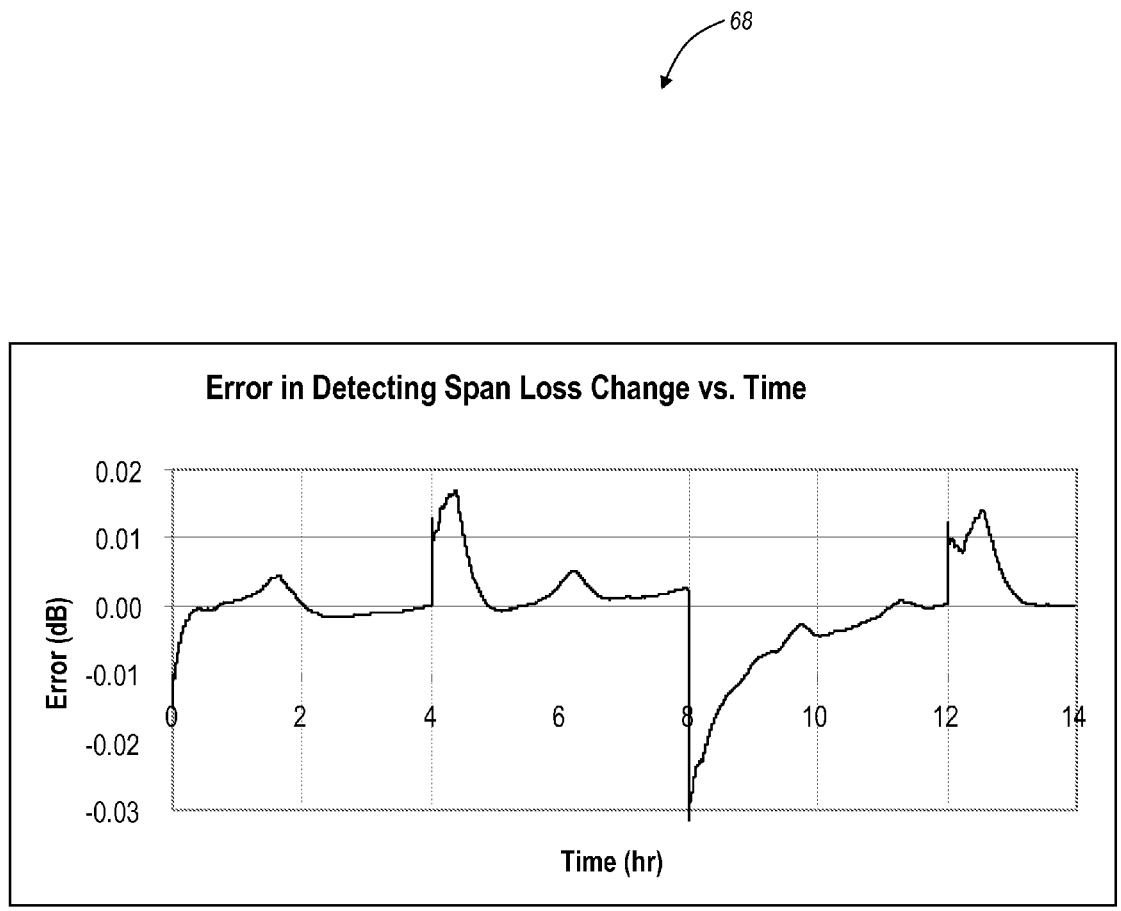
FIG. 7 illustrates a graph of error in detecting span loss change versus time according to an exemplary embodiment of the present invention.

Referring to FIG. 7, a graph 68 illustrates error in detecting span loss change versus time according to an exemplary embodiment of the present invention. From the graph 68, it can be seen that by the end of time intervals: 0-4, 4-8, 8-12 hours, where a span loss change of 0.01 dB has occurred, the error in detecting the span loss change converges to 0 dB. This indicates that the technique is successfully able to detect a span loss change of 0.01 dB or 0.03% within a four hour time interval. Span loss changes greater than 0.03% can be detected in less time. For example, a span loss change of 0.02 dB or 0.05% was detected within a two hour time interval (12th to 14th hour).

Referring to FIG. 8, a table 70 illustrates a summary of performance in detecting small span loss changes from the various graphs 62, 64, 66, 68 according to an exemplary embodiment of the present invention. The table 70 can be provided through a network management system (NMS), element management system (EMS), craft interface (CI), or the like to provide a network operator a view of span loss changes.

Figure 9:
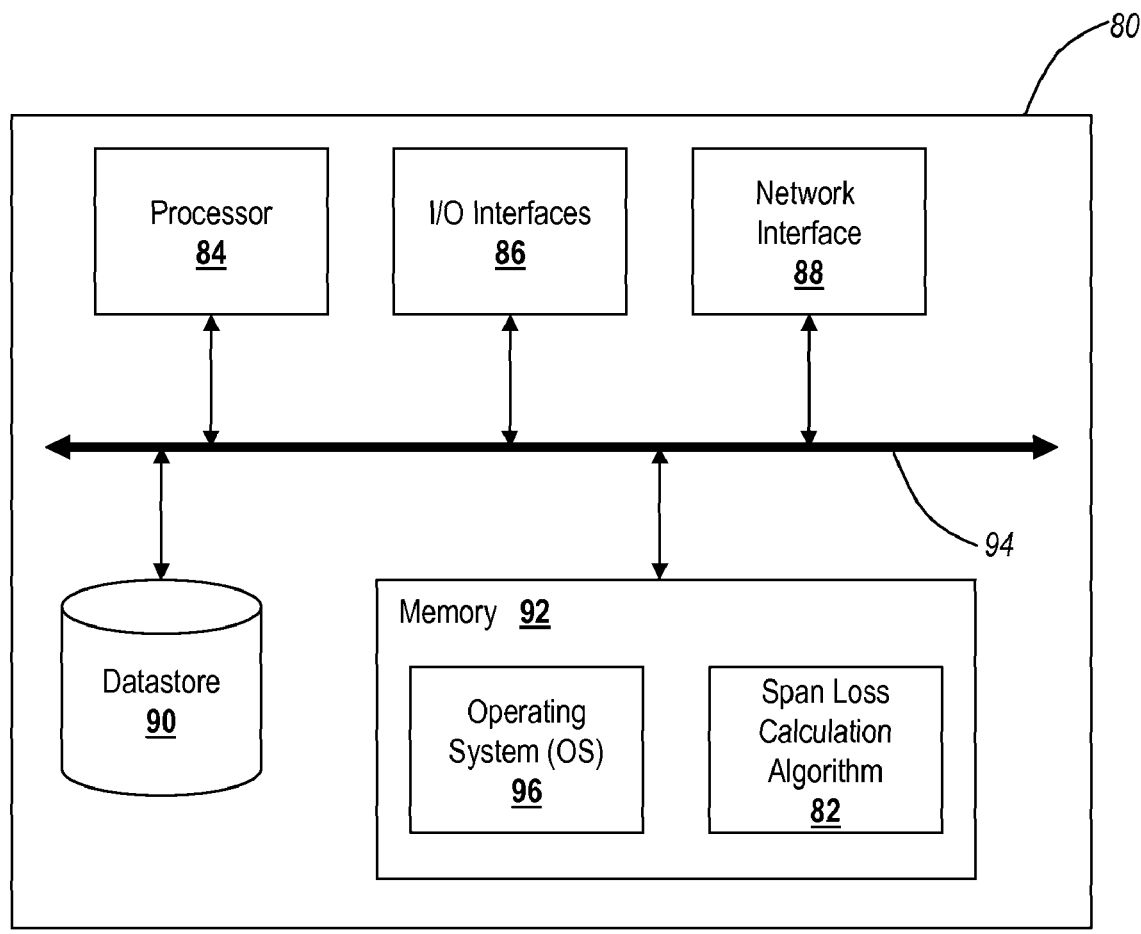
FIG. 9 illustrates a block diagram of a computer for executing a span loss calculation algorithm according to an exemplary embodiment of the present invention.

Referring to FIG. 9, a block diagram illustrates a computer 80 for executing a span loss calculation algorithm 82 according to an exemplary embodiment of the present invention. The computer 80 can be a digital computer that, in terms of hardware architecture, generally includes a processor 84, input/output (I/O) interfaces 86, network interfaces 88, a data store 90, and memory 92. In an exemplary embodiment, the computer 80 can be an NMS, EMS, CI, a local controller on an optical network element, or the like.

The components (84, 86, 88, 90, and 92) are communicatively coupled via a local interface 94. The local interface 94 can be, for example but not limited to, one or more buses or other wired or wireless connections, as is known in the art. The local interface 94 can have additional elements, which are omitted for simplicity, such as controllers, buffers (caches), drivers, repeaters, and receivers, among many others, to enable communications. Further, the local interface 94 can include address, control, and/or data connections to enable appropriate communications among the aforementioned components.

The processor 84 is a hardware device for executing software instructions. The processor 84 can be any custom made or commercially available processor, a central processing unit (CPU), an auxiliary processor among several processors associated with the computer 80, a semiconductor-based microprocessor (in the form of a microchip or chip set), or generally any device for executing software instructions. When the computer 80 is in operation, the processor 84 is configured to execute software stored within the memory 92, to communicate data to and from the memory 92, and to generally control operations of the computer 80 pursuant to the software instructions.

The I/O interfaces 86 can be used to receive user input from and/or for providing system output to one or more devices or components. User input can be provided via, for example, a keyboard and/or a mouse. System output can be provided via a display device and a printer (not shown). I/O interfaces 86 can include, for example, a serial port, a parallel port, a small computer system interface (SCSI), an infrared (IR) interface, a radio frequency (RF) interface, and/or a universal serial bus (USB) interface.

The network interfaces 88 can be used to enable the computer 80 to communicate on a network, e.g., to optical network elements. The network interfaces 88 can include, for example, an Ethernet card (e.g., 10BaseT, Fast Ethernet, Gigabit Ethernet), a wireless local area network (WLAN) card (e.g., 802.11a/b/g/n), or the like. The network interfaces 88 can include address, control, and/or data connections to enable appropriate communications on the network. In an exemplary embodiment, such as illustrated in FIG. 1, the PDs 26, 30 communicate to the computer 80 through the network interfaces 88.

A data store 90 can be used to store data. The data store 90 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 90 can incorporate electronic, magnetic, optical, and/or other types of storage media. In one example, the data store 90 can be located internal to the computer 80 such as, for example, an internal hard drive connected to the local interface 94 in the computer 80. Additionally in another embodiment, the data store can be located external to the computer 80 such as, for example, an external hard drive connected to the I/O interfaces 86 (e.g., SCSI or USB connection). Finally in a third embodiment, the data store may be connected to the computer 80 through a network, such as, for example, a network attached file server. The data store 90 can be utilized to store span loss measurements based on the systems and methods described herein.

The memory 92 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 92 may incorporate electronic, magnetic, optical, and/or other types of storage media. Note that the memory 92 can have a distributed architecture, where various components are situated remotely from one another, but can be accessed by the processor 84.

The software in memory 92 can include one or more software programs, each of which includes an ordered listing of executable instructions for implementing logical functions. The software in the memory 92 includes the span loss calculation algorithm 82 and a suitable operating system (O/S) 96. The operating system 96 essentially controls the execution of other computer programs, such as the span loss calculation algorithm 82, and provides scheduling, input-output control, file and data management, memory management, and communication control and related services. The operating system 96 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), AIX (available from IBM Corporation), or any other operating system.

The span loss calculation algorithm 82 is configured to control power measurement devices, such as photo-detectors, located at optical network elements. Specifically, the span loss calculation algorithm 82 is configured to execute the steps described herein in FIG. 2 to receive periodic power measurements at an OSC transmit point and corresponding periodic power measurements offset by a predetermined time offset at an OSC receive point. Further, the span loss calculation algorithm 82 is configured to integrate or time-average these results to account for temporary fluctuations in span loss.

The computer 80 can store various results from the span loss calculation algorithm 82 in the data store 90. Further, the computer 80 can include a graphical user interface (GUI) to present results to a network operator. In an exemplary embodiment, the computer 80 also provides other operations, administration, maintenance, and provisioning (OAM&P) functions associated with one or more optical network elements. Accordingly, the computer 80 can raise alarms and/or warnings based on results from the span loss calculation algorithm 82.

Advantageously, the present invention can be utilized for the detection of unwelcome fiber taps, the detection of fiber degradation, and the characterization of fiber aging. As described above, the computer 80 could include alarming for detection of unwelcome fiber taps, alarming for the detection of fiber degradation, and analysis tools for the characterization of fiber aging through data gathering and processing.

For example, detection of unwelcome fiber taps or fiber degradation could be done through embedding the loss information calculated by the span loss calculation algorithm 82 into span management software (which also could be run in the memory 92), much in the way other performance metrics are tracked, saved, reported, or alarmed. If the change in span loss exceeds a pre-set threshold, an (optional) alarm could be displayed for the user. To avoid "false alarms" it would be useful to allow the user to disable the feature during planned maintenance operations. During emergency maintenance the user ought to be able to acknowledge and suppress further alarms. After any fiber maintenance, including fiber rolls, there will need to be a mechanism to reset the loss tracking on all affected spans.

Figure 10:
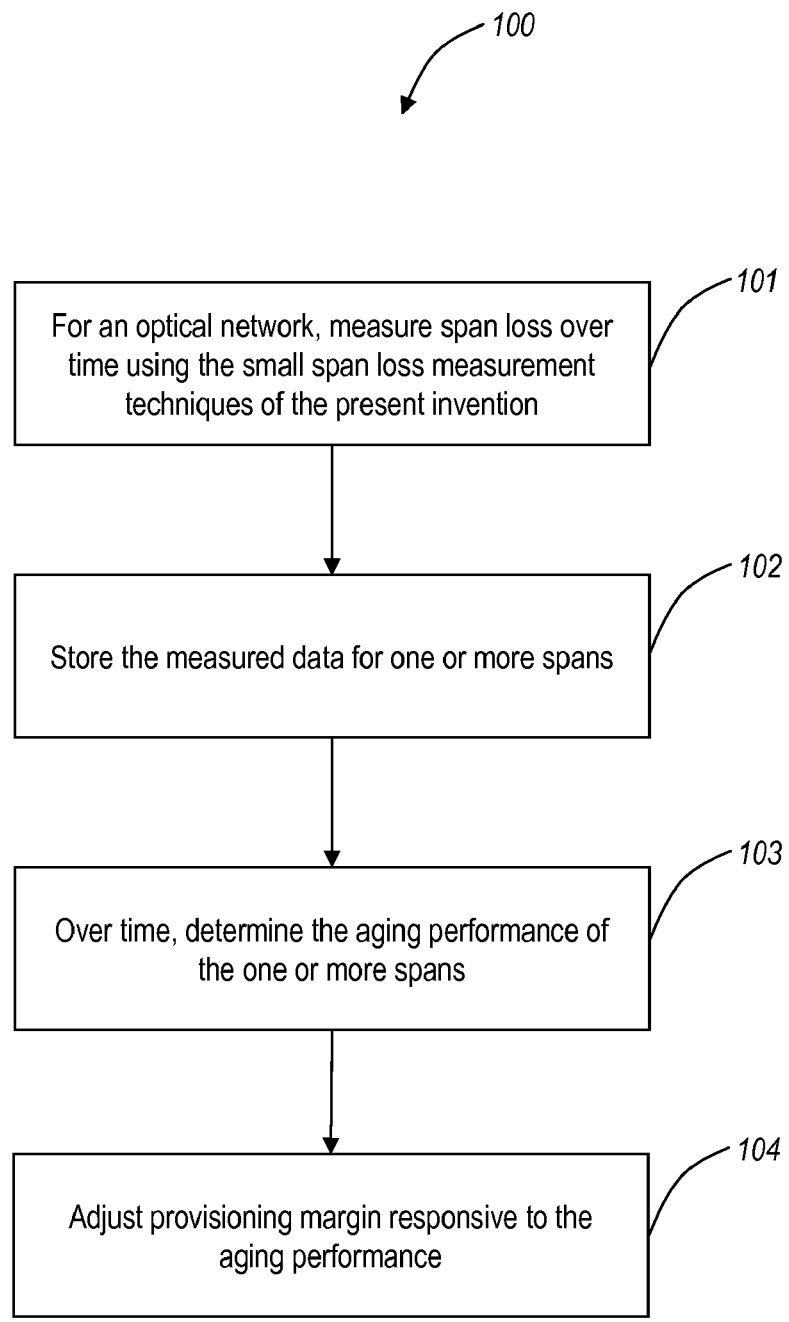
FIG. 10 illustrates a flowchart of a fiber aging application utilizing the small span loss measuring techniques described herein according to an exemplary embodiment of the present invention.

Referring to FIG. 10, a flowchart illustrates a fiber aging application 100 utilizing the small span loss measuring techniques described herein according to an exemplary embodiment of the present invention. First, for an optical network, the span loss is measured over time using the small span loss measurement techniques described herein for the present invention (step 101). The measured data is stored for one or more spans of the optical network (step 102). Over time, the aging performance of the one or more spans is determined (step 103). Finally, the provisioning margin or aging margin is adjusted responsive to the aging performance.

The user will benefit by being able to review the loss data in the context of fiber aging margin used during system design. There are two diametrically opposite cases in which this data is particularly useful. The first is if the fiber aging is minimal compared to margin, while the second is if the fiber aging is approaching the level reserved for aging margin. In the first case, if the user finds that aging is minimal, future channels can be provisioned with less aging margin. Typically aging margin is 1 to 2 dB over life. If experience shows that aging is limited to a much lower value (under 0.5 dB, for example), future channels can be provisioned with less aging margin and hence greater reach; the customer saves money since unnecessary regenerators are avoided.

On the other hand, if fiber aging is accelerated compared to expectations, early warning will allow the user to take protective action before system failures become apparent. The user may have noticed degrading bit error rate (BER), and pinpointing fiber aging in a particular span as a cause can greatly simplify the troubleshooting process. Network operators are likely to be able to roll to another fiber in the bundle or repair the fiber in question. Both of these benefits require us to assume a reasonable degree of stability in the service channel Rx; if the Rx were to degrade it could be difficult to separate this effect from span loss changes. Correlation between span loss changes and transceiver performance (pre-forward error correction (FEC) BER and/or receiver input power) could be helpful in either confirming actual span loss or assuming that the apparent loss is more likely due to OSC Rx degradation.

As described herein, the present invention provides a novel technique for detecting small span loss changes in fiber optics networks. The technique satisfies the criteria for a feasible (i.e., makes use of current architecture), cost-effective (i.e., does not require additional hardware), and highly accurate solution (i.e., capable of detecting span loss changes of 0.01 dB or 0.03%). As a result, the capability of detecting small span loss changes will be useful in a variety of applications, such as monitoring fiber aging for margin analysis, the detection of unwelcome fiber taps, etc. Monitoring fiber aging can also help the customer with future planning. Lower than expected aging allows the customer to use smaller aging margins and more aggressive reach with newly provisioned channels on an existing system. Higher than expected aging can warn the user to consider fiber replacement or repair before customers see any service impact.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for detecting small span loss changes in a fiber optic span, comprising:
sampling power measurements at a transmit point at a predetermined time;
sampling power measurements at a receive point at the predetermined time plus a time delay, wherein the transmit point and the receive point define endpoints of the fiber optic span;
calculating fiber span loss for the predetermined time responsive to the sampled power measurements at the transmit point and at the receive point;
repeating the sampling steps and the calculating step; and
integrating the calculated fiber span losses.

2. The method of claim 1, wherein the time delay comprises a finite propagation time delay (PTD) of optical signals based on the fiber distance from the transmit point to the receive point.

3. The method of claim 2, wherein the time delay Δt is calculated as $$\Delta t = \frac{nL}{c},$$

where n is the fiber refractive index, L is the fiber length from the transmit point to the receive point, and c is the speed of light in a vacuum.

4. The method of claim 1, wherein the calculating fiber span loss comprises dividing the sampled power measurement at the receive point by the sampled power measurement at the transmit point.

5. The method of claim 1, wherein the sampling steps comprise measuring power of an optical supervisory channel added at the transmit point and removed at the receive point.

6. The method of claim 5, wherein the sampling steps utilize a photo-detector at each of the transmit point and the receive point.

7. The method of claim 6, wherein the photo-detector at each of the transmit point and the receive point is controlled by a computer, and wherein the computer is configured to control the sampling steps, and perform the calculating and integrating steps.

8. The method of claim 1, further comprising:
detecting fiber taps on the fiber span responsive to the integrated fiber span losses.

9. The method of claim 1, further comprising:
detecting fiber degradation on the fiber span responsive to the integrated fiber span losses.

10. The method of claim 1, further comprising:
storing the integrated fiber span losses over time; and
analyzing fiber span aging margin responsive to the stored integrated fiber span losses over time.

11. A system for detecting small span loss changes in a fiber optic span, comprising:
a processor communicatively coupled to memory and a network interface, wherein the processor is configured to:
request a power measurement at a transmit point at a predetermined time;
request a power measurement at a receive point at the predetermined time plus a time delay, wherein the transmit point and the receive point define endpoints of the fiber optic span;
calculate fiber span loss of the fiber optic span responsive to the requested power measurements at the transmit point and at the receive point;
store the calculated fiber span loss; and
time average the calculated fiber span loss with one or more stored calculated fiber span losses.

12. The system of claim 11, wherein the processor is located in one of a network management system, an element management system, a craft interface, and a controller on an optical network element.

13. The system of claim 11, wherein the request steps are directed to a photo-detector at each of the transmit point and the receive point.

14. The system of claim 13, wherein the photo-detector at each of the transmit point and the receive point measures an optical supervisory channel added at the transmit point and removed at the receive point.

15. The system of claim 13, wherein the request steps are directed to a field deployed optical network element comprising an optical supervisory channel; and
wherein the system requires no additional hardware on the field deployed optical network element to detect small span loss changes in the fiber optic span.

16. The system of claim 11, wherein the time delay comprises a finite propagation time delay (PTD) of optical signals based on the fiber distance from the transmit point to the receive point; and
wherein the time delay Δt is calculated as $$\Delta t = \frac{nL}{c},$$

where n is the fiber refractive index, L is the fiber length from the transmit point to the receive point, and c is the speed of light in a vacuum.

17. The system of claim 11, wherein the processor is further configured to raise an alarm responsive to one of detecting fiber taps on the fiber span responsive to the time averaged fiber span losses and detecting fiber degradation on the fiber span responsive to the time averaged fiber span losses.

18. The system of claim 11, further comprising a data store, wherein a plurality of time averaged fiber span losses are stored in the data store for the fiber span, and wherein the processor is further configured to analyze fiber span aging margin responsive to the plurality of time averaged fiber span losses.

19. An optical network configured to detect small span loss changes in a fiber optic span, comprising:
a first node comprising an add port for an optical supervisory channel and a first tap connected to the add port and a first photo-detector;
a second node comprising a drop port for the optical supervisory channel and a second tap connected to the drop port and a second photo-detector, wherein the first node and the second node communicate the optical supervisory channel over the fiber optic span; and
a computer communicatively coupled to the first photo-detector and the second photo-detector, wherein the computer is configured to:
request a power measurement at the first photo-detector at a first predetermined time;
request a power measurement at the second photo-detector at a second predetermined time, wherein the second predetermined time comprises the first predetermined time plus a time delay based on a length of the fiber optic span;

calculate fiber span loss of the fiber optic span responsive to the requested power measurements;

store the calculated fiber span loss; and time average the calculated fiber span loss with one or more stored calculated fiber span losses.

20. The optical network of claim 19, wherein the computer is further configured to raise an alarm responsive to one of detecting fiber taps on the fiber optic span responsive to the time averaged fiber span losses and detecting fiber degradation on the fiber optic pan responsive to the time averaged fiber span losses; and wherein a plurality of time averaged fiber span losses are stored in the computer for the fiber optic span, and wherein the computer is further configured to analyze fiber span aging margin responsive to the plurality of time averaged fiber span losses.

* * * * *